Figure 1:
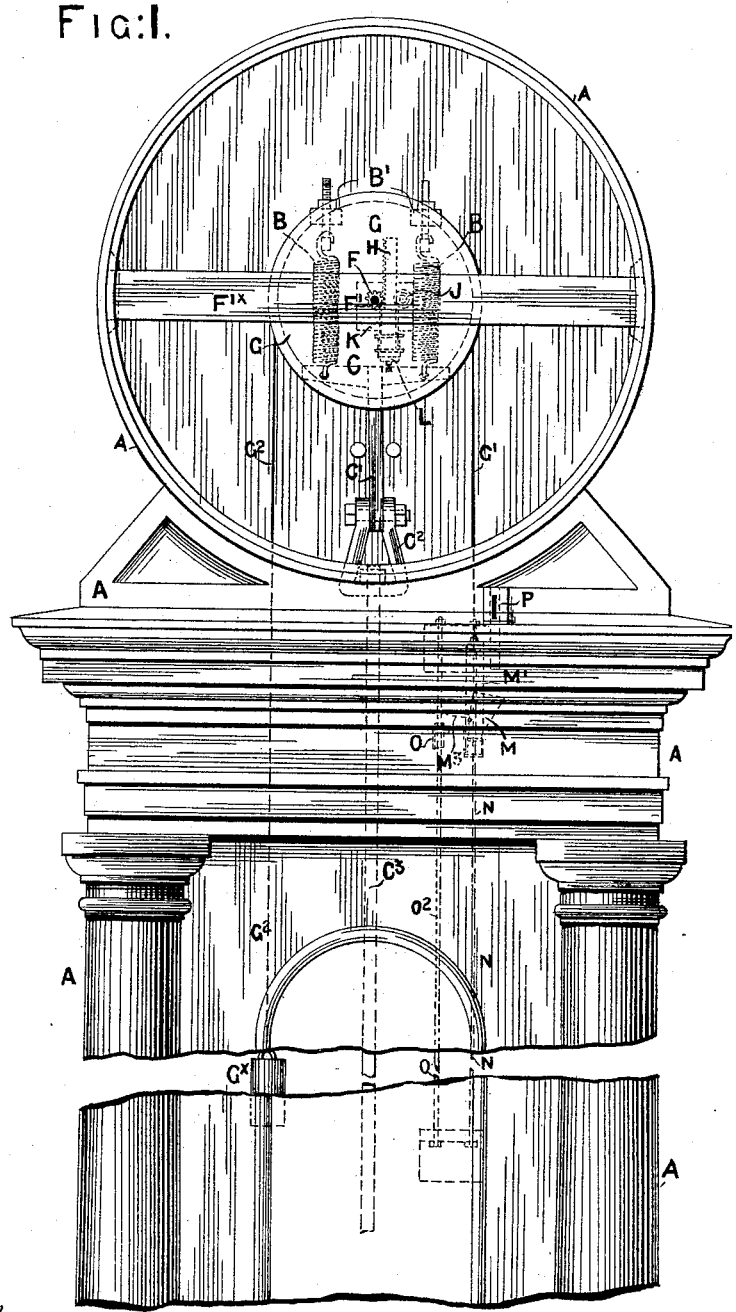

(No Model.) 5 Sheets—Sheet 1.

H. KNIGHT.
COIN FREED WEIGHING MACHINE.

No. 407,483. Patented July 23, 1889.

Witnesses
Chas H Smith
J. Staib

Inventor
Henry Knight
per Lemuel W. Serrell
Atty

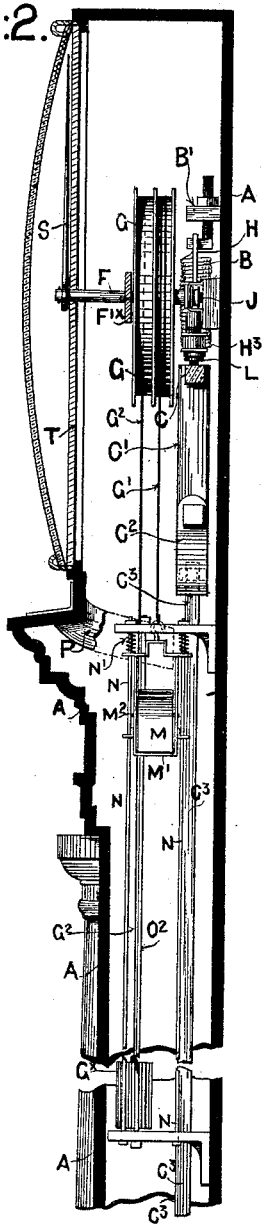

(No Model.) 5 Sheets—Sheet 3.
H. KNIGHT.
COIN FREED WEIGHING MACHINE.
No. 407,483. Patented July 23, 1889.
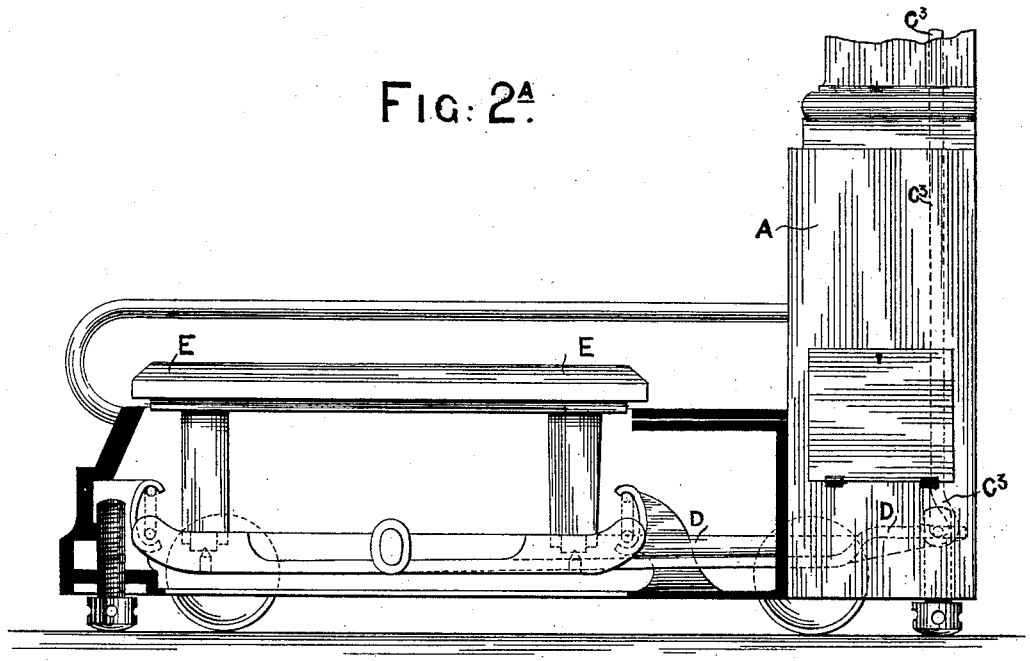
Fig. 2ᴬ
Witnesses
Chas H. Smith
J. Staib
Inventor
Henry Knight
per Lemuel W. Serrell
Atty (No Model.) 5 Sheets—Sheet 4.
H. KNIGHT.
COIN FREED WEIGHING MACHINE.
No. 407,483. Patented July 23, 1889.
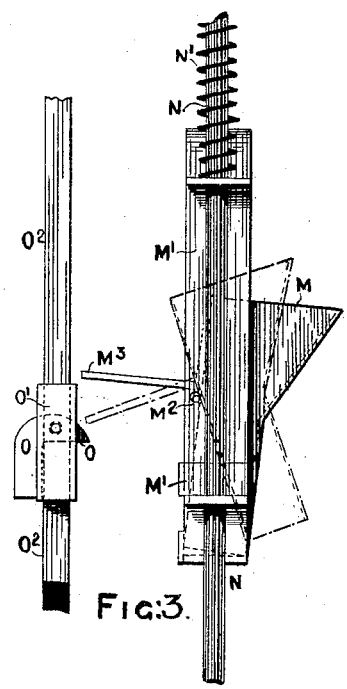
Fig:3.
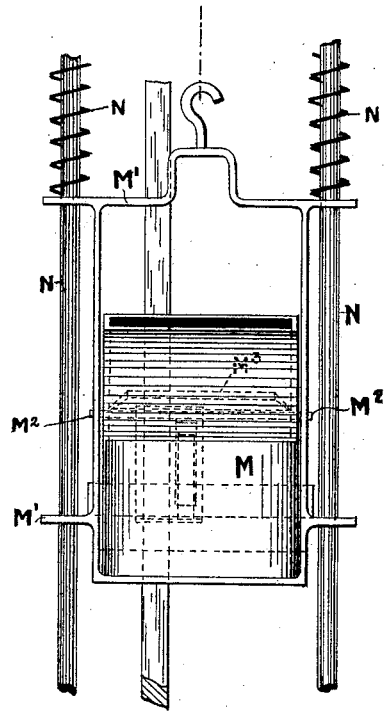
Fig:4.
Fig:5.
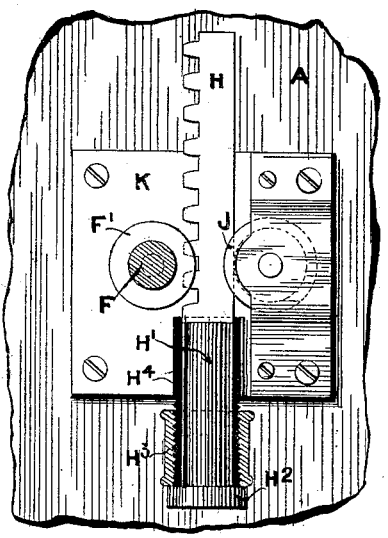
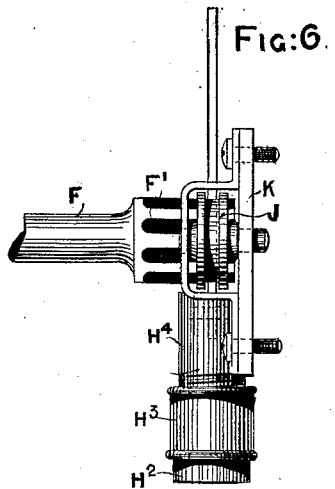
Fig:6.
Witnesses
Chas H Smith
J. Haib
Inventor
Henry Knight
per Lemuel W. Serrell
atty (No Model.) 5 Sheets—Sheet 5.
H. KNIGHT.
COIN FREED WEIGHING MACHINE.
No. 407,483. Patented July 23, 1889.
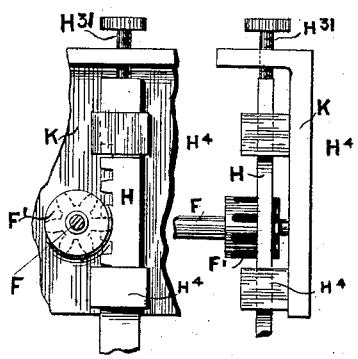
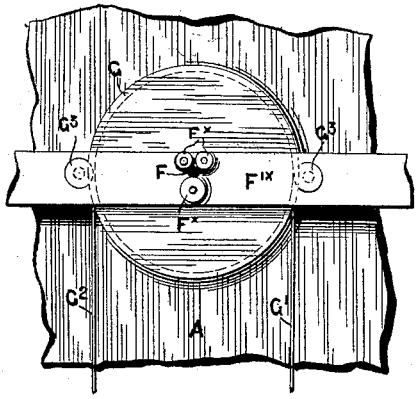
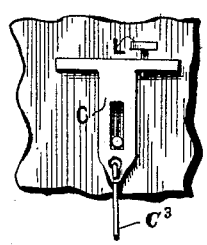
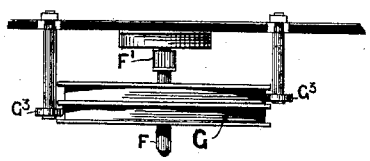
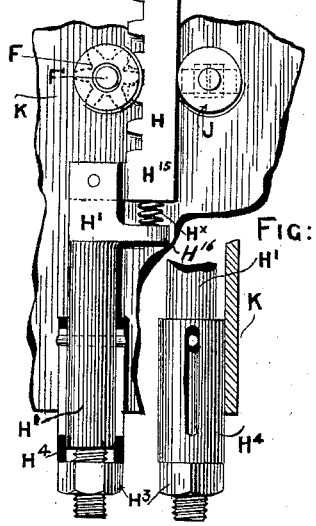
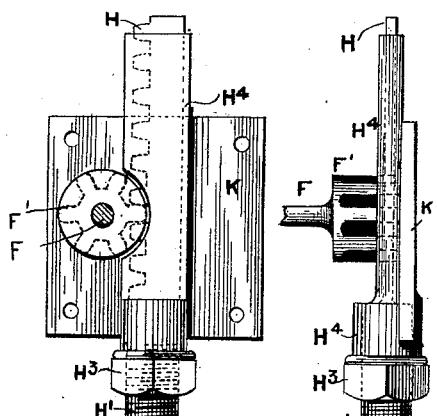
Witnesses
Chas H Smith
J. Staib
Inventor
Henry Knight
per Lemuel W. Serrell
atty

UNITED STATES PATENT OFFICE.

HENRY KNIGHT, OF RYDE, ISLE OF WIGHT, ENGLAND.

COIN-FREED WEIGHING-MACHINE.

SPECIFICATION forming part of Letters Patent No. 407,483, dated July 23, 1889.

Application filed March 16, 1889. Serial No. 303,601. (No model.) Patented in England April 13, 1888, No. 5,492.

*To all whom it may concern:*

Be it known that I, HENRY KNIGHT, a subject of the Queen of Great Britain, residing at Ryde, Isle of Wight, in the county of Southampton, England, have invented certain new and useful Improvements in Coin-Freed Automatically-Acting Weighing-Machines, (for which Letters Patent have been granted to me in Great Britain bearing date April 13, 1888, No. 5,492,) of which the following is a specification.

This invention refers to coin-freed automatically-acting weighing-machines—that is to say, to machines by which the amount of weight or pressure placed or applied thereon will be indicated when a coin is inserted therein—and the said invention is especially applicable to spring-balanced platform weighing-machines.
The object of my said invention is so to construct the mechanism of the said machines that upon a person bringing his or her weight or pressure to bear upon the platform the weighing mechanism will be caused to act, such action, however, not being indicated in any way; but on a coin or coins amounting to the required predetermined weight being inserted the indicating mechanism will then be caused to act and the weight or pressure of the person or goods or other articles upon the platform will be correctly and accurately indicated.

The invention will be best understood by describing the same with reference to the accompanying drawings.

Figure 1 is a front elevation of the upper portion of a weighing-machine constructed according to my invention, the dial and indicating-finger having been removed in order to show the mechanism more clearly. Fig. 2 is a sectional side elevation of Fig. 1, and Fig. 2$^A$ is a side elevation of the base as a continuation of the case in Fig. 2. Fig. 3 is a front elevation showing enlarged details of the coin-receiving vessel, and Fig. 4 is a side elevation of same. Fig. 5 is a front elevation, and Fig. 6 a side elevation, showing a part of the indicating mechanism detached and drawn to a larger scale than the other figures. Figs. 7 to 15, inclusive, show various alternative arrangements of the rack, friction-wheels, and parts connected therewith.

Referring to Figs. 1 to 7, A is the frame or casing of the machine. B B are coiled springs suspended from brackets B' B' on the frame A by means of screw or nutted hooks, so as to be adjustable for varying the tension of the springs B B, as found necessary. To the lower ends of the springs B B is suspended a cross-head C, having a bar C' extending downward to a coupling-piece $C^2$, from which latter a bar $C^3$ extends downward and is connected to one arm of the compound levers D, which latter arm is depressed when the weight or pressure comes onto the platform E. The said compound levers, as well as the platform balanced by coiled springs, have, as I am well aware, been heretofore employed in weighing-machines of a similar type to that here shown, and, being well known, do not present any feature of novelty nor require a more detailed description. The frame-work may be mounted on wheels, as shown, and be provided with a fender or guard around the edge of the platform to prevent more than one person at a time stepping onto the said platform, or more than one person being weighed for one payment.

I will now describe the indicating and coin-receiving mechanism, together with the means for causing it to act in accordance with the weighing mechanism when arranged and constructed according to my said invention.

Mounted on a spindle F, turning in bearings provided in the upper part of the frame or case of the machine, is a pulley or drum G, having two circumferential grooves formed thereon, in which grooves are two cords G' $G^2$, secured at their ends and wound in opposite directions. One of these cords G' passes down and suspends the coin-receiving vessel M, (hereinafter more particularly described,) and the other cord or end $G^2$ carries a weight $G^\times$, to normally hold the coin-receiver in its highest position, as shown in Fig. 1. Straps, steel bands, chains, or other equivalents may be employed instead of the cords G' $G^2$, or there may be one cord instead of two cords. On one end of the spindle F (carried by a bearing-plate $F'^\times$) is a pointer or finger S, which by its movement indicates on a dial T the proportionate extension of the springs caused by the weight or pressure of the person or weight to be weighed, and the variations of extension of the springs are caused by the cross-head C being more or less drawn downward, and it is this motion of the cross-head which I utilize according to my invention, and as hereinafter described, to allow the spindle F and its pointer to be actuated, all as hereinafter described.

On the spindle F is a pinion F', which gears with a rack H, the said rack being guided and held in gear by a grooved friction-wheel J, mounted on a plate K, secured on the frame A, and this wheel J also prevents the rack H from twisting or turning. The rack and the parts immediately connected therewith are shown in detail in Figs. 5 and 6, where it will be seen that the rack (proper) H is connected to or formed with a cylindrical bar H' at its lower end, and is formed with a head $H^2$, a screw-nut or collar $H^3$ being provided to screw onto a tubular guide socket or sleeve $H^4$, which is fixed, by brazing or in any other suitable manner, to the plate K, and through which guide $H^4$ the rack H slides. Thus, the guide $H^4$ being simply a tube, the rack may, when so allowed, drop down, being guided by the said guide-tube $H^4$. The head $H^2$ of the rack H is in such a position that when it is lowered it will abut onto a flat-headed screw L, which is screwed into the cross-head C. The weight $G^x$ retains the coin-receptacle when empty in its highest position, as shown in Figs. 1 and 2, and by the spindle F and pinion F' it also retains the rack H in its highest position without reference to whatever may be the position of the cross-head C, and at this time the pointer or finger should point to zero, and if this is not so then the said pointer may be adjusted and caused to thus point to zero by turning the nut or collar $H^3$, Figs. 5, 6, 9, 11, and 12, or the adjusting-screw $H^{31}$, Figs. 13 and 14, which bears against the rack-head, and will relatively change the position of the rack, and thereby adjust the position of the pointer.

The coin-receiving vessel M, which is suspended by the cord G', may be kept in a vertical line by two fixed guide-rods N N passing through loop-eyes on the sides of a frame M', (see Figs. 3 and 4,) that carries the receiving-vessel M. The body of the vessel M is made open top and bottom and hung in the frame M' by pivots $M^2$. The lower part of the frame M', coming below the open lower end or bottom of the vessel M, forms a bottom for the money to rest on, and there is a projecting arm or lever $M^3$, answering as a lever for upsetting the receiver M by coming against a movable catch O. This catch O is loosely pinned to an adjustable bracket O', mounted on a fixed rod $O^2$, and the catch is rounded at the top edge, but square on the bottom, and is for the purpose of ejecting the coin from the receiving-vessel by tilting it when it comes in contact with the flange in its back or upward motion, the money falling through into a suitable receiver below.

In place of the guide-rods N, I may employ two slotted guides or a tube with a long slot, and a short piece of smaller-size tube with a projecting arm at right angles, the arm coming or extending through the slot and the frame of the receiving-vessel being fixed to this arm. A steel band or cord may be attached to the small tube, which may be moved up and down inside the large tube freely and act as a guide in the place of the guide-rods, as aforesaid. The guide-tube is fixed vertically. I fix a suitable conducting-tube B to convey the coin to the coin-receiving vessel M.

One, two, or more coins of any size may be passed through the slot; but the sum in weight must be sufficient to move the index mechanism. The money may be put into the slot-opening before or while standing on the platform. I, however, prefer to do so while the weight is on the platform; but in any case the index cannot move before the person or other weight is on the platform, the index mechanism being moved by the weight of the money only, and will then follow the motion of the weighing mechanism.

In some cases, instead of the cords G' $G^2$, I may employ steel bands, as is shown in Figs. 7 and 8, and I then fix one end of such thin steel bands in each groove of the wheel G, but in opposite directions. To the other end of one band I attach the money-receiving vessels M, and to the other end of the second band I attach a counterbalance-weight $G^x$.

I use one friction-wheel $G^3$ on each side of the groove-wheel G, bearing against the steel bands to keep them in the grooves, the wheel $G^3$ being suitably mounted for that purpose.

In Figs. 7 and 8, referred to, the wheel G is mounted on a spindle, and the bearings of the spindle F are on friction-wheels $F^x$, mounted on the bearing-plate $F'^x$. One end of the spindle F projects through the hole in the center of the dial and carries the index-finger. The pinion F' may be geared to the toothed rack H in the manner shown in Figs. 9, 13, and 14; and in Fig. 9 a right-angled foot-piece $H^{15}$, formed with the rack H, is pivoted to the upper end of the metal bar H', so as to form a working-joint, and under the bottom of the rack is a coiled spring $H^x$, resting on a foot-piece $H^{16}$ to keep the rack to its work in mesh with the pinion F', and against the back of the rack H and opposite the pinion a friction-wheel J is mounted on the plate K to aid in keeping the rack in gear with the pinion. This pinion F' is not shown in Figs. 11 and 12 for the sake of clearness.

The guide socket or sleeve $H^4$ may be either round, square, flat, or other shape, provided the metal bar H' fits it so as to allow it to move freely vertically; but when a round metal bar H', as shown in Figs. 9 and 10, is used the guide-socket $H^4$ is slotted to allow the two projecting pins that are fixed into the round bar H' to move up and down the slots and prevent the said bar from turning round.

Various alternative arrangements may be employed for guiding the rack and holding it in gear with the pinion F'. For example, the rack H may, as is shown in Figs. 11 and 12, work in a fixed guide composed of a flat hollow case or socket H⁴, carried by the framework. The hollow socket H⁴ has an aperture therein for the pinion F' to work into the rack, with which it is kept in gear. Alternative arrangements may be employed, instead of the screw-collar H³, for adjusting the rack. For example, as shown in front and side elevation in Figs. 13 and 14, I may employ a screw H³, screwing onto a bracket K, fixed to the frame. On the bracket there are fixed guide straps, loops, or brackets, through which the rack H passes, and the screw H³ acts as a stop abutting against the top of the rack.

Instead of the cross-head C being used, as shown in Fig. 1, I may use such a cross-head as is shown in Fig. 15, having a slot and stop-pin for guiding the same, and provided with the flat-headed abutting screw L.

By providing the base part of the framework with pull-handles the weight and strength may be had for one payment, the weight being first indicated; then if the handles are pulled the strength will be indicated in addition to the weight.

The action of the machine is as follows: When a person places himself (or a body to be weighed is placed) on the platform E, the compound levers D will pull down the rod C³ and the cross-head C, extending the springs B B to a distance corresponding with the weight on the platform. When the money is placed in the chute P, it passes into the receiving-vessel M, and causes the said vessel M to immediately descend and the weight G× to rise, causing the grooved wheel G, also the pointer or finger, the spindle F, and pinion F', to rotate, and the rack H is thereby made to descend through the socket or sleeve H⁴ until the head H² of the metal bar of the rack abuts onto the head of the screw L in the cross-head C, when the weight of the person or body on the platform will be indicated on the dial. As the coin-receiving vessel M descends, the catch O is tilted up by the weight of the vessel and coin and allows the flange M³ to pass. It then falls back to its normal position. When the weight is taken off the platform E, the springs B B contract, and the cross-head C pushes up the rack H, so causing the mechanism to resume its normal position. As the coin-receiving vessel M rises, the flange M³ comes in contact with the catch O, which is now rigid, and so tilts the coin-receiving vessel M, as shown by dotted lines in Fig. 3, and thus releases the coin by allowing it to fall through the bottom of the vessel M into a suitable bag or receiver. Springs N' are provided to prevent the jarring of the coin-receiver M in its upward movement.

Two or more of the catches O may be fixed at various distances apart on the vertical rod, if desired.

I claim as my invention—

1. In automatic coin-freed weighing-machines, the combination, with the cross-head C and its operating mechanism, of the pulley G, the cord around the same, the coin-receiving vessel M, attached to said cord, the vertical guides for the coin-receiver, the spindle F, upon which the pulley is mounted, and the pinion and pointer upon said spindle, and the rack-bar meshing with said pinion, whereby the descent of the coin-vessel and revolution of the pinion permit the rack-bar to descend until stopped by contact with the cross-head, substantially as and for the purposes specified.

2. In an automatic coin-freed weighing-machine, the compound weighing-levers D, rod C³, coiled springs B B, and T-shaped cross-head C, all operated by the weight or pressure of the person or object to be weighed, in combination with the separately acting and detached rack H, the pinion F', the spindle F, the grooved pulleys G, and the cords G' G², and the coin-receiving vessel M and its counterpoise G×, all operated by the weight of a coin or several coins, as set forth.

3. In automatic coin-freed weighing-machines, the weighing-platform, weighing-springs, connecting-rods, and the cross-head C, in combination with the receiving-vessel M, with guides N and counter-weight G×, the cords G' G², pulley G, spindle F, the pointer and the pinion F', and the rack H, said indicating mechanism being balanced, as described, whereby accuracy of indication is insured, as set forth.

4. In weighing-machines, the combination, with the cross-head C, of the weighing-rod and the screw L in same, the coin-vessel M, guides N, counter-weight G×, the cords G' G², pulley G, the pointer and pinion F', carried by spindle F, and the rack H, the adjustment nut or collar H³, the rack-guide H⁴, and rack-head H², whereby the pointer may be adjusted, as set forth.

5. The coin receptacle or vessel M, open at the top and bottom and having pivots M² and an arm M³, a frame surrounding said vessel and in which it is hung by said pivots, the lower part of said frame forming the bottom of the receptacle and serving to retain a coin, in combination with the weighing mechanism and a stop to swing the coin-receptacle upon the upward movement and deliver the coin, substantially as specified.

6. In automatic coin-freed weighing-machines, the combination, with a weighted cord and pulley around which the cord passes, of the guides N, the strap-frame M', to which one end of the cord is secured, the tilting coin-receiving vessel M, open at both ends and pivoted in the frame M' and having an arm M³, and the latch o, for operating the arm, whereby the lower part of the frame M' forms a bottom to the coin-vessel to retain the coin until the same is discharged by tilting the vessel, substantially as specified.

HENRY KNIGHT.

Witnesses:
CHAS. G. VINCENT,
  Solicitor, Ryde, Isle of Wight.
WM. GRIFFIN,
  Elmfield, near Ryde, Law Clerk.